(12) United States Patent
Yoo et al.

(10) Patent No.: US 12,615,370 B2
(45) Date of Patent: Apr. 28, 2026

(54) IMAGE DECODING METHOD AND APPARATUS THEREFOR

(71) Applicant: LG Electronics Inc., Seoul (KR)

(72) Inventors: Sunmi Yoo, Seoul (KR); Junghak Nam, Seoul (KR); Jaehyun Lim, Seoul (KR); Naeri Park, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 18/286,007

(22) PCT Filed: Apr. 6, 2022

(86) PCT No.: PCT/KR2022/004968
§ 371 (c)(1),
(2) Date: Oct. 6, 2023

(87) PCT Pub. No.: WO2022/216051
PCT Pub. Date: Oct. 13, 2022

(65) Prior Publication Data
US 2024/0187599 A1     Jun. 6, 2024

(30) Foreign Application Priority Data

Apr. 8, 2021     (KR) ........................ 10-2021-0045693

(51) Int. Cl.
| | |
|---|---|
| *H04N 19/132* | (2014.01) |
| *H04N 19/105* | (2014.01) |
| *H04N 19/159* | (2014.01) |
| *H04N 19/176* | (2014.01) |
| *H04N 19/33* | (2014.01) |

(52) U.S. Cl.
CPC ......... *H04N 19/132* (2014.11); *H04N 19/105* (2014.11); *H04N 19/159* (2014.11); *H04N 19/176* (2014.11); *H04N 19/33* (2014.11)

(58) Field of Classification Search
CPC .. H04N 19/132; H04N 19/105; H04N 19/159; H04N 19/176; H04N 19/33; H04N 19/177
See application file for complete search history.

(56) References Cited

U.S. PATENT DOCUMENTS

| | | | |
|---|---|---|---|
| 2018/0048896 A1* | 2/2018 | Park | H04N 19/587 |
| 2022/0014752 A1* | 1/2022 | Deng | H04N 19/176 |
| 2023/0254508 A1* | 8/2023 | Pfaff | H04N 19/59 |
| | | | 375/240.12 |

FOREIGN PATENT DOCUMENTS

| | | | | |
|---|---|---|---|---|
| WO | WO-2020171644 A1 * | 8/2020 | | H04N 19/105 |
| WO | WO-2021035717 A1 * | 3/2021 | | H04N 19/11 |

* cited by examiner

*Primary Examiner* — Kathleen V Nguyen
(74) *Attorney, Agent, or Firm* — Fish & Richardson P.C.

(57) ABSTRACT

An image decoding method performed by a decoding apparatus according to the present document comprises the steps of: deriving an intra prediction mode of a current block; scaling neighboring samples for the current block so as to derive modified neighboring reference samples for the current block; deriving prediction samples for the current block on the basis of the intra prediction mode and the modified neighboring reference samples; deriving a reconstructed block for the current block on the basis of the prediction samples; and upscaling the reconstructed block so as to derive a modified reconstructed block.

13 Claims, 11 Drawing Sheets

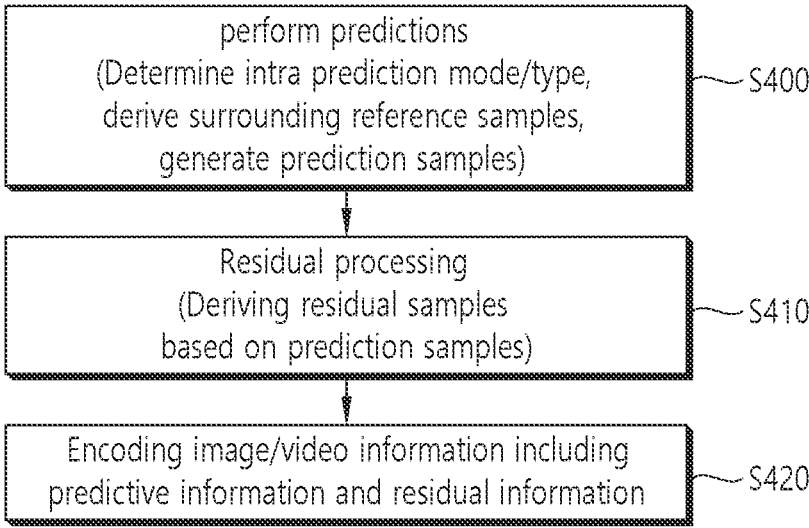

perform predictions
(Determine intra prediction mode/type,
derive surrounding reference samples,
generate prediction samples) — S400

Residual processing
(Deriving residual samples
based on prediction samples) — S410

Encoding image/video information including
predictive information and residual information — S420

FIG. 5

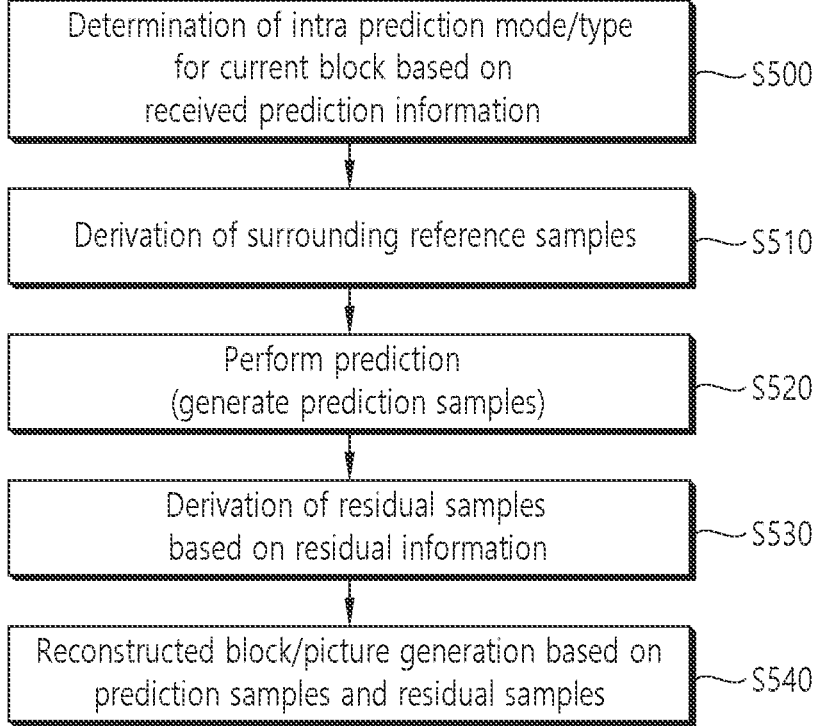

Determination of intra prediction mode/type
for current block based on
received prediction information — S500

Derivation of surrounding reference samples — S510

Perform prediction
(generate prediction samples) — S520

Derivation of residual samples
based on residual information — S530

Reconstructed block/picture generation based on
prediction samples and residual samples — S540

| | |
|---|---|
| Intra prediction mode/type determination | ∼S600 |
| Derivation of surrounding reference samples | ∼S610 |
| Perform intra prediction | ∼S620 |

| | |
|---|---|
| Determine scale factors (a, b) of MxN coding units and perform scaling | ∼S700 |
| Coding scaled coding units with aMxbN | ∼S710 |
| Restore a coding unit of size aMxbN | ∼S720 |
| Restore aMxbN size video to MxN size (using FIR/IIR filters or neural network models) | ∼S730 |

FIG. 10

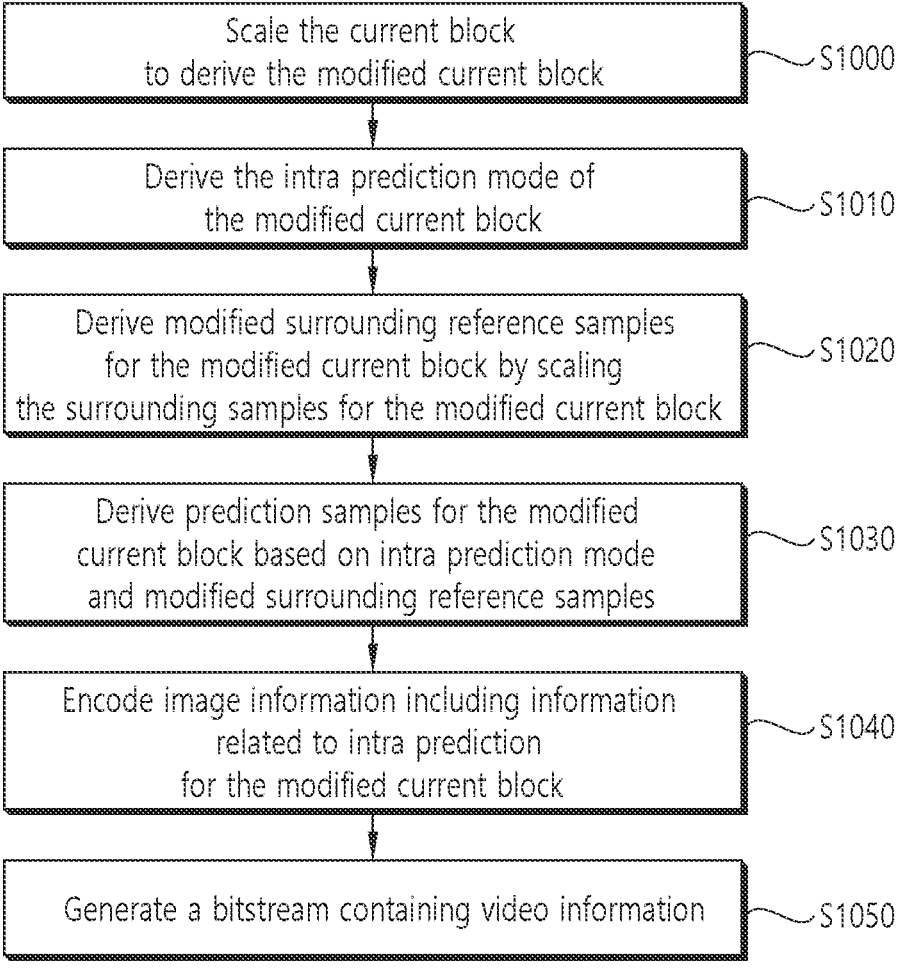

| Scale the current block to derive the modified current block | ~S1000 |

| Derive the intra prediction mode of the modified current block | ~S1010 |

| Derive modified surrounding reference samples for the modified current block by scaling the surrounding samples for the modified current block | ~S1020 |

| Derive prediction samples for the modified current block based on intra prediction mode and modified surrounding reference samples | ~S1030 |

| Encode image information including information related to intra prediction for the modified current block | ~S1040 |

| Generate a bitstream containing video information | ~S1050 |

FIG. 12

Derive the intra prediction mode of the current block — S1200

Scales the surrounding samples for
the current block to derive modified surrounding
reference samples for the current block — S1210

Derive prediction samples for the current block
based on intra prediction mode
and modified surrounding reference samples — S1220

Derive a restored block for the current block
based on prediction samples — S1230

Upscale the restoration block
to derive a modified restoration block — S1240

FIG. 13

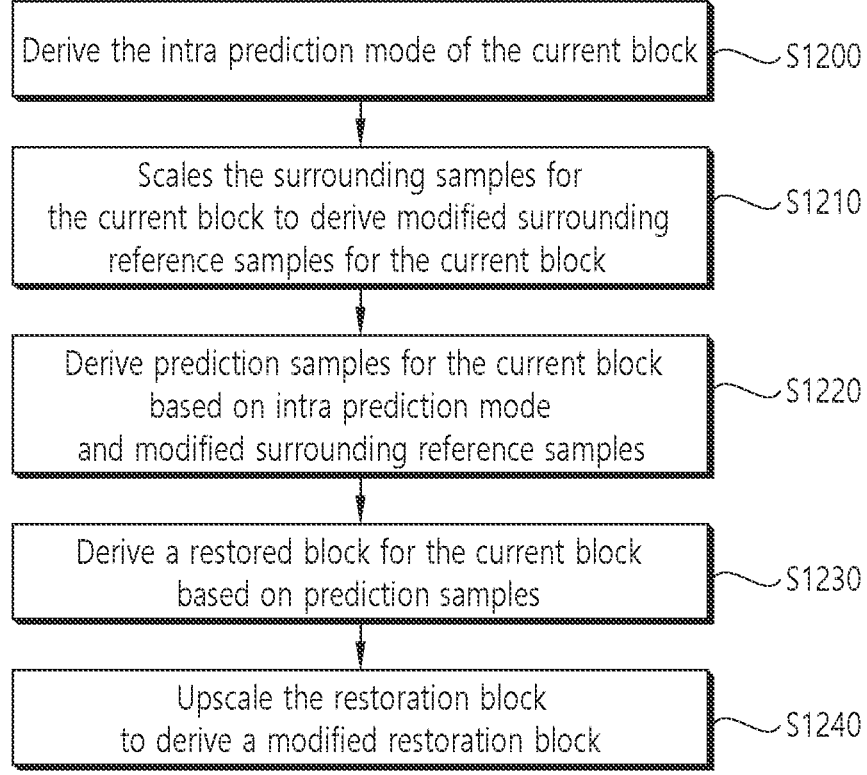

IMAGE DECODING METHOD AND APPARATUS THEREFOR

CROSS-REFERENCE TO RELATED APPLICATIONS

This application is a National Stage application under 35 U.S.C. § 371 of International Application No. PCT/KR2022/004968, filed on Apr. 6, 2022, which claims the benefit of Korean Patent Application No. 10-2021-0045693, filed on Apr. 8, 2021. The disclosures of the prior applications are incorporated by reference in their entirety.

TECHNICAL FIELD

This document relates to video coding technology, and more specifically, to a video decoding method and device using block-based adaptive multi-resolution intra prediction in a video coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

Another technical task of this document is to provide an efficient intra prediction method and device.

Another technical task of this document is to provide a method and device for performing intra prediction on a block whose resolution has been adjusted on a block-by-block basis and deriving a reconstructed block by performing scaling.

According to an embodiment of this document, an image decoding method performed by a decoding device is provided the method comprises deriving an intra prediction mode of a current block, deriving modified neighboring reference samples for the current block by scaling neighboring samples for the current block, deriving prediction samples for the current block based on the intra prediction mode and the modified neighboring reference samples, deriving a reconstructed block for the current block based on the prediction samples and deriving a modified reconstructed block by upscaling the reconstructed block.

According to another embodiment of this document, a decoding device that performs video decoding is provided. The decoding device is characterized in that it includes a prediction unit deriving an intra prediction mode of a current block, deriving modified neighboring reference samples for the current block by scaling neighboring samples for the current block, deriving prediction samples for the current block based on the intra prediction mode and the modified neighboring reference samples and an addition unit deriving a reconstructed block for the current block based on the prediction samples and deriving a modified reconstructed block by upscaling the reconstructed block.

According to another embodiment of this document, a video encoding method performed by an encoding device is provided. The method comprises deriving a modified current block by scaling a current block, deriving an intra prediction mode of the modified current block, deriving modified neighboring reference samples for the modified current block by scaling neighboring samples for the modified current block, deriving prediction samples for the modified current block based on the intra prediction mode and the modified neighboring reference samples, encoding image information including intra prediction related information for the modified current block and generating a bitstream including the image information.

According to another embodiment of this document, a video encoding device is provided. The encoding device is characterized by including a prediction unit deriving a modified current block by scaling a current block, deriving an intra prediction mode of the modified current block, deriving modified neighboring reference samples for the modified current block by scaling neighboring samples for the modified current block, deriving prediction samples for the modified current block based on the intra prediction mode and the modified neighboring reference samples and an entropy encoding unit encoding image information including intra prediction related information for the modified current block and generating a bitstream including the image information.

According to another embodiment of the present document, a computer-readable digital storage medium storing a bitstream including image information generated by a specific method is provided. In a computer-readable digital storage medium, the specific method comprises deriving a modified current block by scaling a current block, deriving an intra prediction mode of the modified current block, deriving modified neighboring reference samples for the modified current block by scaling neighboring samples for the modified current block, deriving prediction samples for the modified current block based on the intra prediction mode and the modified neighboring reference samples, encoding image information including intra prediction related information for the modified current block and generating the bitstream including the image information.

According to this document, an intra prediction coding method can be performed based on a scaled coding block, through which the amount of information about the coding block can be reduced and overall coding efficiency can be improved.

According to this document, information related to reference samples and intra prediction can be adjusted by considering the resolution difference between the scaled coding block and the neighboring block, through this, adaptive multi-resolution intra prediction can be performed efficiently, the amount of information about coding blocks can be reduced and overall coding efficiency can be improved.

According to this document, a neural network model for adaptive multi-resolution intra prediction can be adaptively derived based on coding blocks, and through this, the coding performance and efficiency of adaptive multi-resolution intra prediction can be improved.

BRIEF DESCRIPTION OF THE DRAWINGS

FIG. 2 is a schematic diagram illustrating a configuration of a video/image encoding apparatus to which the embodiment(s) of the present disclosure may be applied.

FIG. 4 illustrates an example of an intra prediction-based video/image encoding method.

FIG. 5 illustrates an example of an intra prediction-based video/image decoding method.

FIG. 10 schematically shows an image encoding method using an encoding device according to this document.

FIG. 12 schematically shows a video decoding method using a decoding device according to this document.

FIG. 13 schematically shows a decoding device that performs the image decoding method according to this document.

MODE

Figure 1:
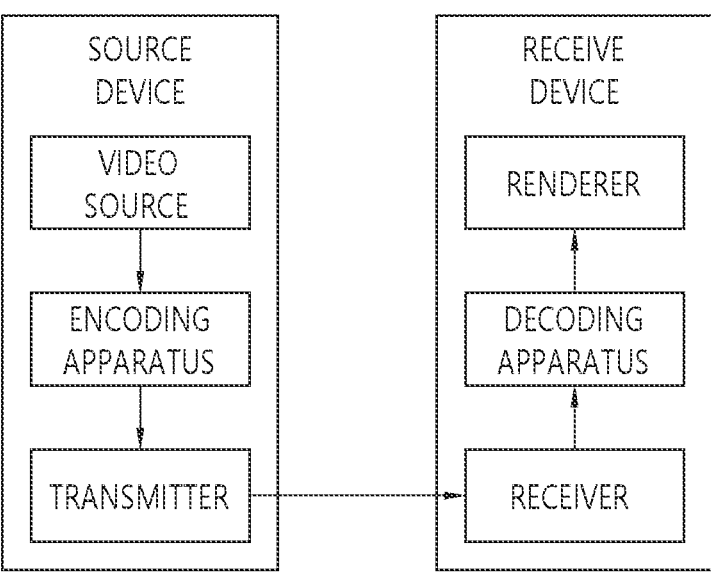
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
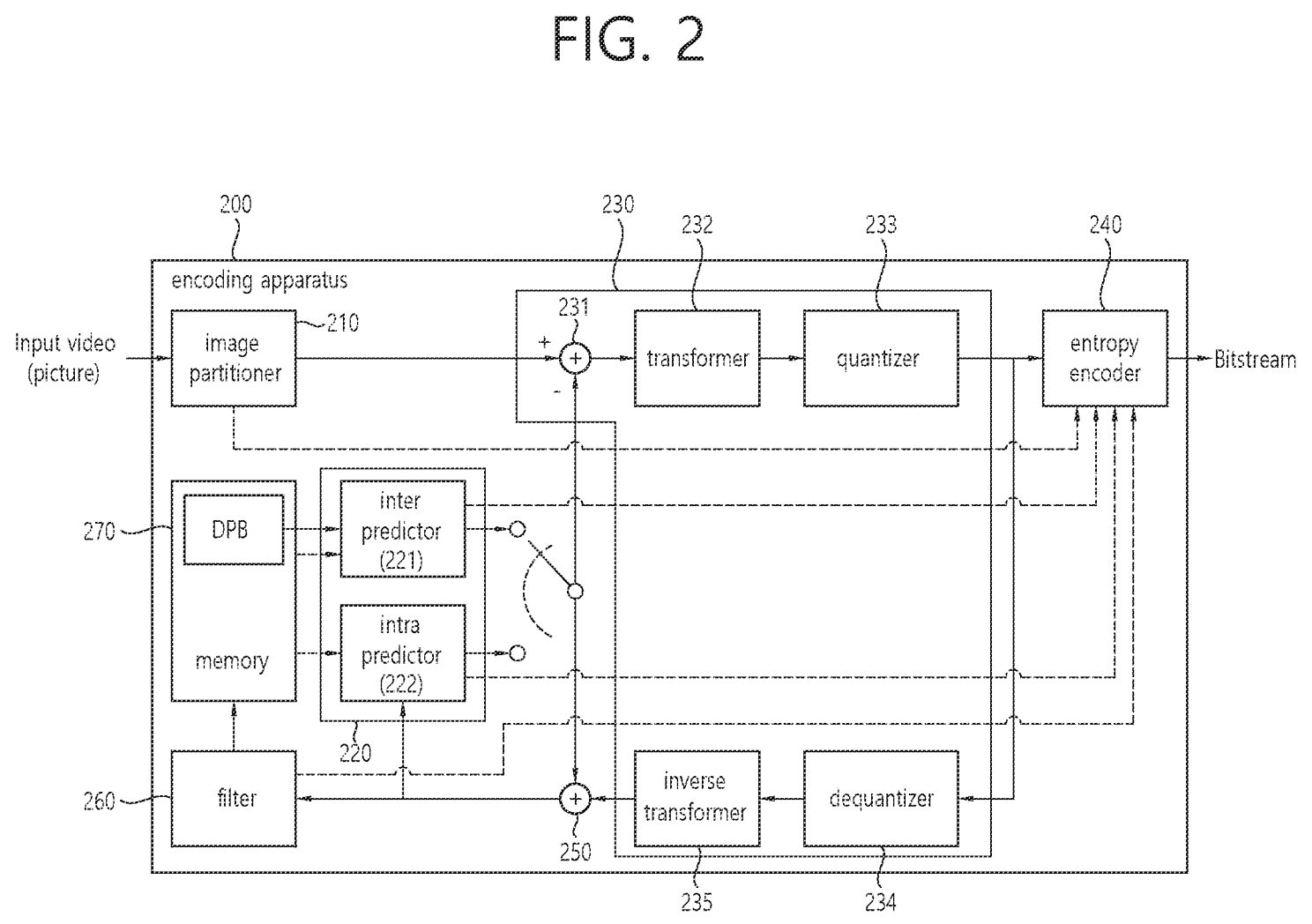

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
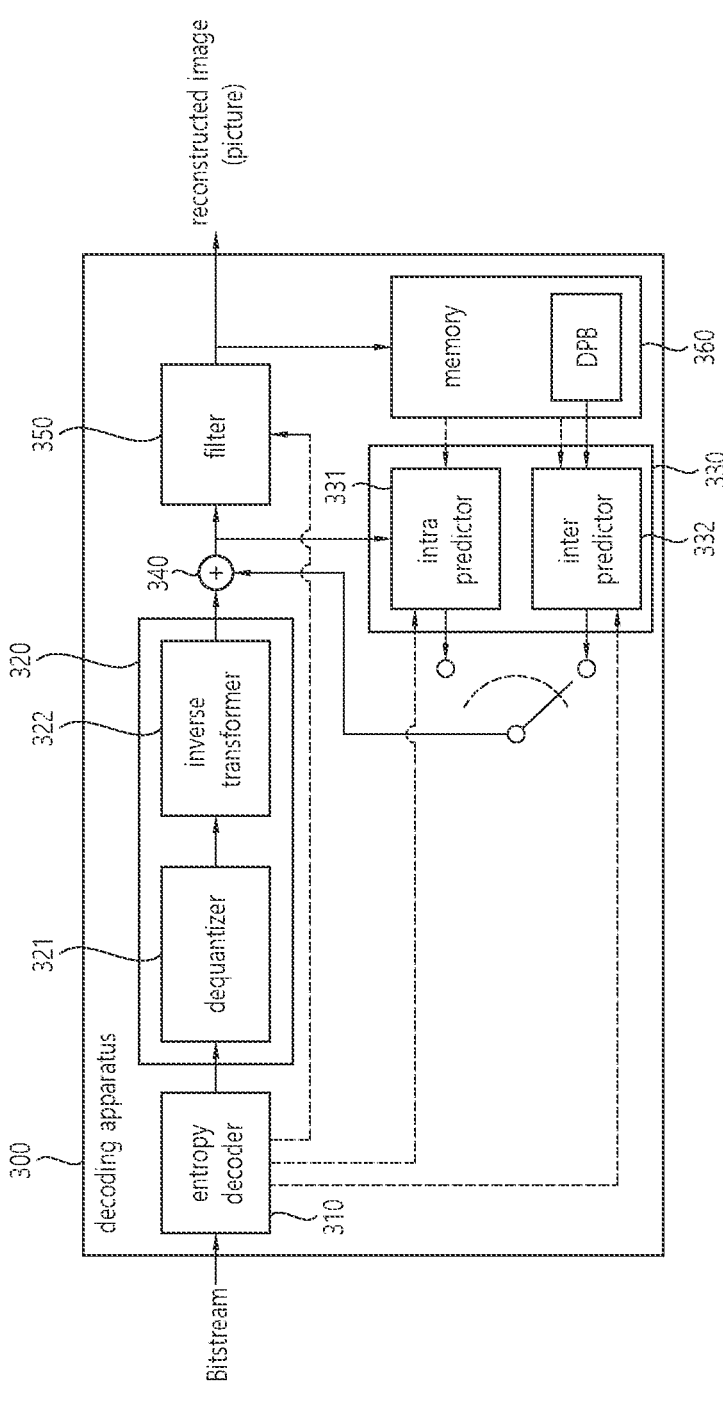
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex.

video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CHIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

For reference, for example, the intra prediction mode may include two non-directional (or non-angular) intra prediction modes and 65 directional (or angular) intra prediction modes. The non-directional intra prediction modes may include a planar intra prediction mode of number 0 and a DC intra prediction mode of number 1, the directional intra prediction modes may include 65 intra prediction modes numbered 2 to 66. However, this is an example and the embodiments of this document can be applied even when the number of intra prediction modes is different.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample FIG. 4 illustrates an example of an intra prediction-based video/image encoding method.

Referring to FIG. 4, the encoding device performs intra prediction on the current block S400. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S410. The encoding device may compare the prediction samples in the original samples of the current block based on the phase and derive the residual samples.

The encoding device may encode image information including information on the intra prediction (prediction information) and residual information on the residual samples S420. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

FIG. 5 illustrates an example of an intra prediction-based video/image decoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S500. The decoding device may derive neighboring reference samples of the current block S510. The decoding device generates prediction samples in the current block based on the intra prediction mode/type and the neighboring reference samples S520. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S530. The decoding device may generate reconstructed samples for the current block based on the prediction samples and the residual samples, and may derive a reconstructed block including the reconstructed samples S540. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (e.g., CABAC, CAVLC).

Figure 6:
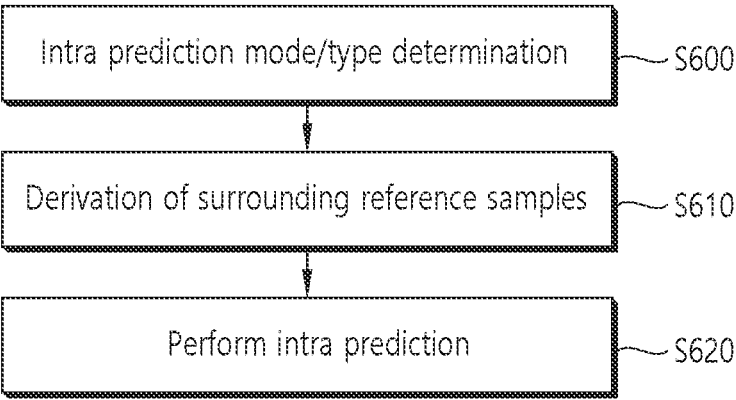
FIG. 6 schematically shows an intra prediction procedure.

FIG. 6 schematically shows an intra prediction procedure.

Referring to FIG. 6, as described above, the intra prediction procedure may include a step of determinating an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 6, the coding device determines an intra prediction mode/type S600.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (eg, the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planar mode as a candidate is that the planar mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg. intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample) Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate mpm flag (ex. intra_mip_mpm_flag) for the MIP, an mpm index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the mpm flag may not be performed. In this case, the decoding device may infer that the mpm flag is 1 without separately signaling the mpm flag.

Meanwhile, in general, when the intra prediction mode of the current block is not the planar mode and is one of the MPM candidates in the MPM list, the encoding device generates an mpm index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaning intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S610. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S620. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, this document proposes a method of generating reference samples using adaptive multi-resolution and performing intra prediction-based encoding/decoding using the generated reference samples. The encoding/decoding procedure based on the intra prediction may be performed by the intra prediction unit 222 of the above-described encoding device and the intra prediction unit 331 of the decoding device.

One embodiment of this document proposes an adaptive multi-resolution intra prediction coding method. For example, when coding unit-based image/video, the amount of information related to the coding unit generated by variously adjusting the size of the coding unit determined by segmentation information is saved, the specification proposes a method of improving coding efficiency by restoring scaled coding units to target resolution through various methods including neural network models or filters.

In general, when coding a still image or moving image, a method of dividing the entire image into coding units and coding each coding unit may be used. In this case, the size and division information of the coding unit can be fully reconstructed by mutually agreed upon between the encoding device and the decoding device or by transferring the division information and size information from the encoding device to the decoding device. For example, in the VVC standard, an image can be divided into CTUs (Coding Tree Units) of size 128×128, and each CTU can be divided into blocks of various sizes depending on the division method. That is, for example, in the VVC standard, a picture can be divided into CTUs (Coding Tree Units) of size 128×128, each CTU may be divided into blocks (eg, coding units) of various sizes depending on the division method. Here, whether to further divide each CTU can be determined by searching for the optimal cost using rate-distortion optimization (RD optimization) in the encoding device. The cost may be called RD cost. For example, if a CTU contains complex textures or objects, it may be advantageous for the CTU to do a lot of block division, CTUs containing generally smooth, uncomplicated textures can maintain coding efficiency by performing fewer segmentations.

However, the size of partition information, intra-block coding mode information, residual signal information, etc. may increase proportionally as the block size increases. Therefore, in the embodiment of this document, the block to be coded is scaled to reduce it to a size smaller than the current size, after coding with scaled blocks, the specification proposes a coding method using only coding information (segmentation information, prediction mode information, residual signal, etc.) related to the coding. For example, the decoding device reconstructs the block by performing a general decoding process based on the coding information of the scaled block, the reconstructed block can be reconstructed to the block's original size before scaling through various methods, including neural network models or filters. Through this, the effect of being able to reconstruct an intact image while reducing coding information can be created.

Figure 7:
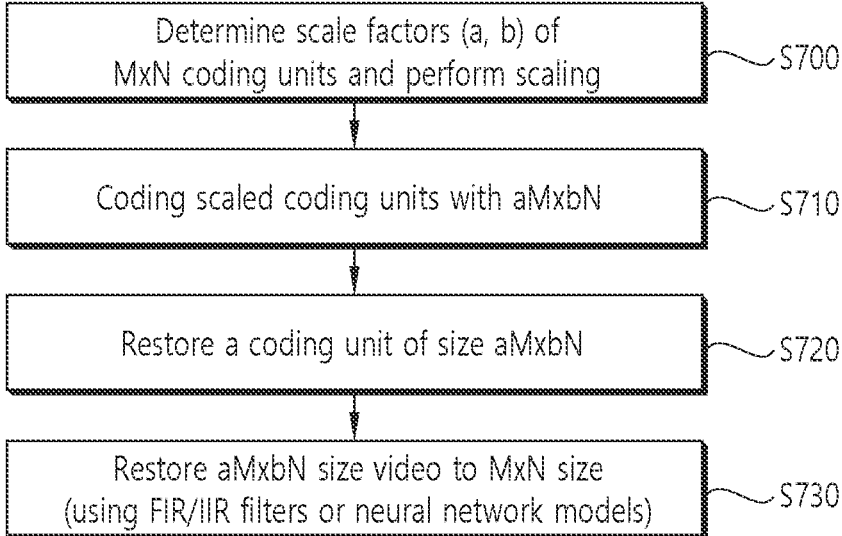
FIG. 7 exemplarily shows an adaptive multi-resolution intra prediction method.

FIG. 7 exemplarily shows an adaptive multi-resolution intra prediction method.

This embodiment proposes a method of scaling and coding an image by applying various scale factors when a coding unit is determined.

The encoding device determines the scale factor of the coding unit of M×N size and scales the coding unit based on the determined scale factor (S700).

For example, the decoding device can derive the scale factor of a coding unit that is a coding target and scale the coding unit based on the derived scale factor. The scale factor may include a scale factor for the width and a scale factor for the height of the coding unit. Here, the scale factor for the width can be expressed as a and the scale factor for the height can be expressed as b. For example, the scale may have separate scale factors a and b for each side, or a may be equal to b. That is, the scale factor a for the width and the scale factor b for the height may be different from each other or may be the same.

The encoding device codes a coding unit scaled to aM×bN size (S710).

For example, a current CTU of size 128×128 may be scaled to a 64×64 block. In this case, a and b may be ½. The encoding device can use a scaled coding unit to code and derive block partition information, mode information, and a residual signal for the coding unit. That is, the encoding device can perform encoding for the scaled coding unit and encode block partition information, mode information, and residual signals for the scaled coding unit. For example, if a 128×128 CTU is scaled to 64×64 in width and height by ½, the encoding device can code and transmit information about a block of size 64×64.

The decoding device reconstructed the coding unit scaled to aM×bN size (S720). The decoding device can reconstructed the coding unit scaled to aM×bN size. For example, a decoding device may obtain image information for the scaled coding unit, a reconstructed block for the scaled coding unit can be derived based on the image information.

The decoding device reconstructs the image with aM×bN size into blocks of M×N size (S730). The decoding device may derive a reconstructed block of size M×N by upscaling the reconstructed block for the scaled coding unit based on Finite Impulse Response (FIR) filters, Infinite Impulse Response (IIR) filters, or neural network models, etc. The reconstructed block of size M×N may be called a final reconstructed block or a modified reconstructed block.

That is, even when reconstructing a coded coding unit, the decoding device can first reconstructed the scaled block, the reconstructed image (i.e., the reconstructed scaled block) can be completely reconstructed by upscaling it to its original size using various methods, including neural network models or filters. For example, even when reconstructed, the decoding device can reconstruct the scaled coding unit with information about the scaled coding unit of 64×64 size, this can be done by applying an upscale/interpolation filter to the reconstructed image (e.g. a DCT-based interpolation filter in the HEVC/VVC standards, etc.), this can be reconstructed into a complete coding unit of 128×128 size by inputting the reconstructed image into a neural network model. When the neural network model is used for upscaling, a convolutional neural network (CNN) is used, or a fully connected neural network model may be used. Alternatively, various types of neural network models that can reconstruct the image (i.e., upscale the image) can be applied.

Meanwhile, the method proposed in this embodiment can be applied to all coding units or can be used adaptively in coding units. Alternatively, the method can be used adaptively for each frame. Alternatively, the method can be used adaptively for each slice. For example, when the scale is determined adaptively for a coding unit, frame, or slice, a flag for scale may be transmitted for each coding unit, frame, or slice. Additionally, scale factor information may be transmitted as a flag for each coding unit, frame, or slice. Alternatively, the scale factor may be a specific scale factor promised between the encoding device and the decoding device, and may be implicitly used. That is, a preset scale factor can be used. Alternatively, scale information or whether to use the proposed adaptive multi-resolution intra prediction method may be transmitted in high-level syntax. Here, the high-level syntax may be Video Parameter Set (VPS), Sequence Parameter Set (SPS), Picture Parameter Set (PPS), Decoding Parameter Set (DPS), Picture Header (PH), Adaptation Parameter Set (APS) and/or Slice Header (SH). Additionally, scale information can be stored in each block/slice/picture and used when coding a neighboring block, or specific scale information promised between the encoding device and the decoding device can be used.

Alternatively, application of the method proposed in this embodiment may be determined based on various criteria. For example, whether to apply the method may be determined depending on whether the current coding unit is a luma component or a chroma component. For example, the proposed method can be applied only to the luma component. Alternatively, the proposed method can be applied only to coding units of a specific size. For example, the proposed method can only be applied to coding units sized 32×32 or larger. That is, for example, the proposed method can be applied only when the size of the current coding unit is larger than a certain size. Alternatively, whether to apply the proposed method may be determined based on slice information of the current slice. For example, the proposed method can be applied only when the current slice information is I-Slice. That is, for example, the proposed method can be applied only when the current slice including the current block is an I slice. Alternatively, whether to apply the proposed method may be determined based on mode information of the current coding unit. For example, the proposed method can be applied only when the prediction mode of the current coding unit is intra prediction mode.

Meanwhile, neural networks based on learning data are already being used in many fields, among them, Convolution Neural Network (CNN) is showing excellent performance in the field of image recognition. The neural network may also be referred to as an artificial neural network. A detailed description of the neural network and the CNN will be described later as follows.

Figure 8:
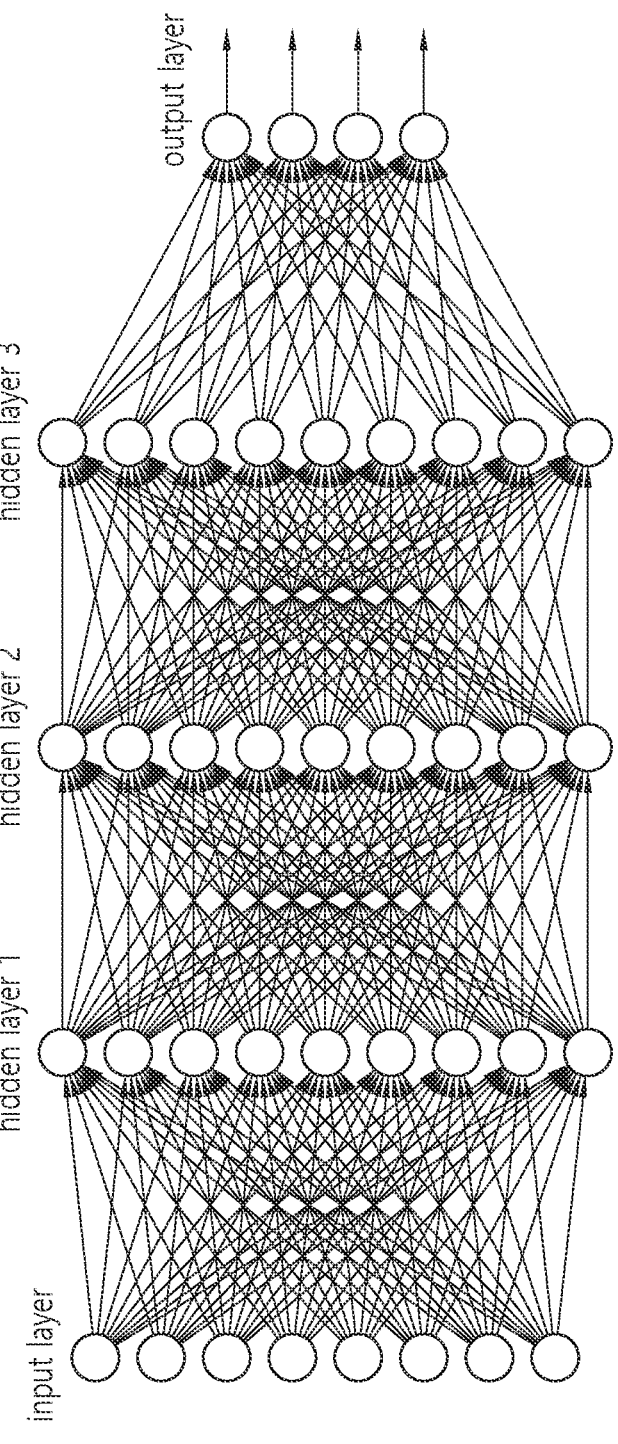
FIG. 8 exemplarily illustrates a neural network.

FIG. 8 exemplarily illustrates a neural network.

The neural network is a class of algorithms based on the idea of interconnected neurons. The neurons in a general neural network may include a data value, thereby affecting values of neurons to which the respective data values are connected according to the connection, such as whether the sum of a predefined strength for each connection and connections for the respective specific neurons exceeds a predefined threshold value. By determining appropriate connection strength and threshold value (a procedure also called "training"), the neural network may effectively recognize images and characters. To make the connection between groups more clear, and make the connection for each operation of the value, the neurons may be mainly grouped as a "layer". Referring to FIG. 8, the general neural network may include three types of layers. The three types of layers may include an input layer, a hidden layer, and an output layer.

The input layer may represent a layer for providing an input to the neural network model. The number of neurons of the input layer may be equal to the number of features of data. For example, the number of neurons of the input layer may be equal to the number of samples of an input picture.

The hidden layer may represent a layer between the input layer and the output layer. The input of the input layer may be supplied to the hidden layer. Further, the neural network may include one or more hidden layers according to the model and the size of the data. Generally, the hidden layer may include a larger number of neurons than the number of features. That is, generally, the hidden layer may include a larger number of neurons than the number of neurons of the input layer. Further, if a plurality of hidden layers exist, the hidden layers may include different numbers of neurons. The output of each hidden layer may be calculated by multiplying the output of a previous layer by a learnable weight of the corresponding hidden layer, and then adding an activation function making the neural network nonlinear followed by a learnable bias.

The output layer may represent the layer including the output of the neural network model. The output of the hidden layer may be transferred to a logistic function which transforms the output of each class.

The neural network illustrated in FIG. 8 may represent an exemplary embodiment called a fully-connected neural network. As illustrated in FIG. 8, each of the neurons of the layer may be connected to neurons of a next layer. For example, referring to FIG. 8, the neurons of the input layer may be connected to all neurons of a hidden layer 1. Further, as illustrated in FIG. 8, each of the neurons of the hidden layer 1 may receive an input value from each of the neurons of the input layer. Subsequently, the input values input to the neurons may be summed, and the summed value may be compared with the bias or the threshold value. If the summed value is larger than the threshold value of the neurons, the summed value may be used as a value used as the input for the neurons of a next layer in the neurons. The aforementioned operation may be performed through various layers of the neural network, and continuously performed until reaching a final layer, that is, an output layer.

Meanwhile, an example of the neural network includes the convolution neural network (CNN). The CNN shows excellent performance against many computer vision and machine learning problems. Specifically, the CNN shows excellent performance by the following reasons.

Character recognition.

Natural images have the characteristics called stationary.

Biological plausibility from a visual cortex

Here, the character may represent an area in which neighboring samples have high correlations and local features, and distant samples have low correlations. Further, the characteristics called stationary may mean the feature in which statistics of one portion of the image are the same as those of another portion thereof.

Unlike the fact that the neurons of the neural network receive the input value from all nodes of the previous layer, the input values of a set including features (i.e., nodes) spatially or temporally close to the node in the previous layer may be input to the neurons of a specific layer in the CNN. That is, the CNN may be operated by associating the arrangement of the values instead of a single value with each of the neurons. The set may also be represented as a receptive field. The set may be derived as a 3×3 set or a 5×5 set. An M×N set may represent a group of the nodes composed of M columns and N rows. Therefore, the CNN requires a function capable of processing a local 2-D structure.

Figure 9:
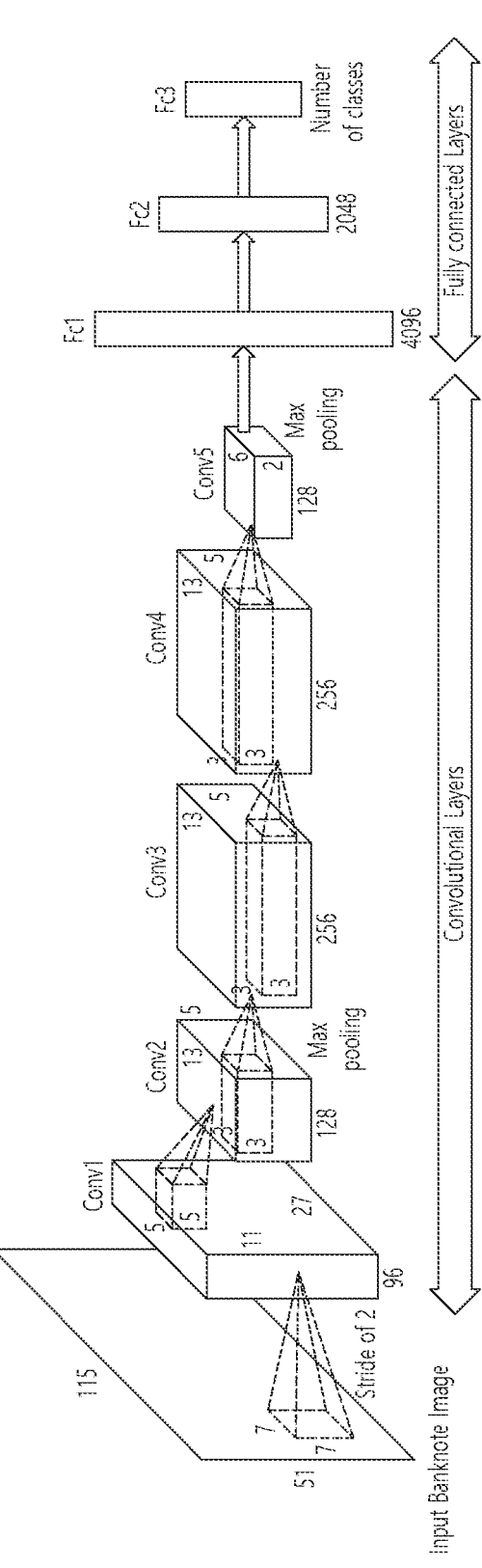
FIG. 9 exemplarily illustrates the convolution neural network.

FIG. 9 exemplarily illustrates the convolution neural network. Further, the set may be conceptually represented as a small image patch, and the convolution may be used for the transform of the values of the neurons for subsequent layers instead of multiplication. That is, the connection strength may be a convolution kernel rather than a scalar value. Referring to FIG. 9, the CNN may include three layers to be described later.

Convolution layer

Pooling layer

Fully-connected layer

The convolution layer may represent a layer for calculating the output value for the node connected to a local region of the input. The output value for each node may be calculated by a dot product between the weight and the regions connected to the input volume for the node. For example, the input for the node may be derived through a rectified linear unit (RELU) layer to which an elementwise activation function such as MAX (0, x) defined in the following Equation is applied.

$$\text{Max}(x, y) = \begin{cases} x & ; & x >= y \\ y & ; & x < y \end{cases} \qquad \text{Equation 1}$$

The pulling layer may perform a down sampling operation according to a spatial dimension. The down sampling may represent a process of deriving the maximum value or the average value among the values of the nodes of the corresponding region. Subsequently, the output values of the pulling layer may be input as the input value for the fully-connected layer, that is, the fully-connected neural network.

Additionally, this document proposes a method of configuring a reference sample when performing multi-resolution intra prediction proposed in the above-described embodiment.

In general, when performing intra prediction, intra prediction is performed using samples that have already been reconstructed in the surrounding area to remove spatial redundancy, the difference value between the predicted sample derived from the intra prediction and the original image (i.e., the original sample) may be coded. For example, if scale is applied to the current coding unit as in the above embodiment, because the reconstructed image has the scaled size of the reconstructed image or is stored at the original input size, depending on when it is adjusted to the original scale, reference samples must also be constructed based on scale information to enable more accurate predictions. Therefore, this embodiment proposes a method of configuring a reference sample for intra prediction when performing multi-resolution intra prediction.

As an example, the encoding device/decoding device may perform scaling on the reference sample using the scale factor of the current coding unit. For example, assuming that all divided blocks are reconstructed to the original scale immediately after coding the block, if the scale factors for the width and height of the current coding unit are a and b, respectively, depending on the scale factor of each side, the scale can be adjusted by subsampling the left reference sample by 1/b and the upper reference sample by 1/a. For example, when the current coding unit scales each side by ½, the left reference samples and the upper reference samples can be scaled by subsampling 2 samples at a time. In other words, for example, if the current coding unit scales each side by ½ (i.e., the scale factor for the width and the factor for the height of the current coding unit are ½), scaled left neighboring samples can be derived by subsampling the left neighboring samples of the current coding unit by 2 samples, scaled upper neighboring samples may be derived by subsampling the upper neighboring samples of the current coding unit by 2 samples. The scaled left neighboring samples may be derived as left reference samples for intra prediction of the current coding unit, the scaled upper surrounding samples may be derived as upper reference samples for intra prediction of the current coding unit. In applying the scale factor, the process of applying a pre-processing filter for the reference sample may be performed before applying the scale factor, or may be performed after applying the scale factor. Alternatively, a process of applying a preprocessing filter based on a filter that is different from a process of applying a preprocessing filter when the scale factor is not applied may be performed. Alternatively, whether to apply a preprocessing filter may be determined based on whether or not a scale factor is applied.

Or, if a certain size must be satisfied at the time of reconstruction to the original scale, whether or not the sample is scaled can be determined based on whether a reference sample at an adjacent location is scaled, and a reference sample can be configured accordingly. For example, a block located at the border of a CTU may refer to a neighboring CTU in intra prediction. If one CTU is both coded and reconstructed to its original scale (i.e., reconstructed and stored at its original resolution in units of CTUs), since the blocks in the surrounding CTU have already been reconstructed in size at the original resolution, the block and scale within the CTU currently being coded may be different. Therefore, whether the reference sample is derived from a block within the same CTU as the current CTU containing the current coding unit, or whether the reference sample is derived from a block in a different CTU than the current CTU, based on this, it can be decided whether to perform scale when constructing a reference sample, according to the above decision, a reference sample for intra prediction may be constructed. Here, for example, the filter used for scale may be a 3-tap filter of [1, 2, 1]/4.

Alternatively, the filter used for scale may be a 5-tap filter of [−1, 9, 16, 9, −1]/32. Alternatively, it may be a down sampling filter applied in the SHVC standard. Alternatively, for example, a separate filter may be determined based on the scale factor and the sub-pel position of the sample to be scale changed. Or, for example, the filter used for scale may be an RPR down-sampling filter of the VVC standard. For example, the filter may be used regardless of the scale factor or may be selected in various ways depending on the scale factor.

This document proposes a mode information reference method when performing multi-resolution intra prediction proposed in the above-described embodiment.

For example, in video coding, in order to efficiently use redundant information, prediction can be efficiently performed using not only reconstructed samples of neighboring units, but also prediction mode information, transformation information, motion vector information, reference picture information, etc. However, if the previously proposed multi-resolution intra prediction is performed, since the current block has been transformed by the scale factor, in order to refer to information on the neighboring block, we propose a method of applying the scale factor to the distance information between the current block and the neighboring block. For example, if the current coding unit size is 128×128 and ½ scale is applied and adjusted to 64×64 size, if the left neighboring unit of the current coding unit is a block to which scale is not applied, the left neighboring unit corresponding to (0, 32) can be derived by accessing the information of (−1, 64) rather than (−1, 32). That is, for example, if the current coding unit is a block adjusted to a size of 64×64 with ½ scale applied, and the upper left position of the current coding unit is (0, 32), for intra prediction of the current coding unit, a coding unit corresponding to the position of (−1, 64) rather than (−1, 32) may be derived as a left peripheral unit for referencing intra prediction mode information, etc. That is, when the current coding unit is scaled and resized, and the surrounding coding units of the current coding unit are not resized, position information about the neighboring coding unit may be adjusted based on the scale factor of the current coding unit, and the neighboring coding unit may be derived based on the adjusted position information.

Also, for example, this embodiment proposes a method of approaching by applying the scale applied to the neighboring block when the current block is not scaled but the neighboring block is a scaled block. For example, if the size of the current coding unit is 128×128 and the surrounding coding unit on the left is scaled by ½ and adjusted to 64×64, the left peripheral unit corresponding to (0,32) can be derived by accessing the information of (−1, 16) rather than (−1, 32). That is, for example, the size of the current coding unit is 128×128, and the left surrounding coding unit is a block adjusted to the size of 64×64 with ½ scale applied, if the upper left position of the current coding unit is (0, 32), for intra prediction of the current coding unit, a coding unit corresponding to the position of (−1, 16) rather than (−1, 32) may be derived as a left peripheral unit for referring to intra prediction mode information, etc.

Or, for example, even when the scales of the current coding block and surrounding coding blocks are different from each other, the original size and coordinate information can be stored regardless of scale. That is, for example, even when the scales of the current coding block and neighboring coding blocks are different from each other, the information of the corresponding block can be stored in the original size and coordinate information regardless of scale. Here, the coordinate information may represent the location information. For example, if the current block is scaled to a size smaller than the original size, coding information (prediction mode information, transformation information, quantization information, residual data information, motion vector information, and/or reference picture information, etc.) may be copied and stored as much as the ratio a. Alternatively, if the current block is scaled and larger than the original size, the coding information may be downsampled by the ratio a' and stored. Therefore, in order to access the neighboring block for intra prediction of the current block, information can be derived by accessing the neighboring block without scaling the coordinate information by the scale ratio.

Or, for example, even if it is included in the same coding unit, whether or not the scale is applied may differ depending on whether it is a luma component or a chroma component, and in this case, the same method as above can be applied. For example, even if only the luma component is scaled, it is the same as above, coordinate information to be referenced can be adjusted based on chroma component subsampling information (RGB/BGR, YUV4:2:0, YUV4:4: 4, etc.) and scale factor, information can be derived by accessing the block corresponding to the adjusted coordinate information. That is, for example, if only the luma component of the current coding block is scaled, that is, if the current luma block is scaled, the coordinate information of the neighboring block can be adjusted based on the chroma component subsampling information and scale factor. A block corresponding to the adjusted coordinate information may be derived as a neighboring block for intra prediction of the current luma block.

This document proposes a method for selecting a neural network model when performing multi-resolution intra prediction proposed in the above-described embodiment.

For example, when outputting a small image as a large image using a neural network model, various factors can be considered. When performing general lossy video coding, a neural network model can be selected and used based on quantization parameters that determine the size and degree of degradation of coding information. That is, for example, when the multi-resolution intra prediction is performed, a neural network model used to upscale the reconstructed block can be derived based on the quantization parameter for the current coding block. For example, if the quantization parameter of the current coding unit is less than a threshold, the A neural network model can be used, and if the quantization parameter is more than the threshold, the B neural network model can be used. That is, for example, if the quantization parameter for the current coding block is below the threshold, a first neural network model can be derived as a neural network model used to upscale the reconstructed block for the current coding block, if the quantization parameter for the current coding block is above the threshold, a second neural network model may be used as a neural network model used to upscale the reconstructed block for the current coding block. The neural network model used in the proposed embodiment of this document may be one or more, and may be a neural network model learned in advance according to the quantization parameter.

Additionally, for example, a neural network model may be selected and used depending on whether the image has a luma component or a chroma component. For example, if the current coding unit is an image with a luma component, an A neural network model may be used, if the current coding unit is an image with a chroma component, a B neural network model can be used. That is, for example, if the current coding block is a luma component, the first neural network model may be derived as the neural network model used to upscale the reconstructed block for the current coding block, when the current coding block is a chroma component, a second neural network model may be used as the neural network model used to upscale the reconstructed block for the current coding block. There may be more than one neural network model used in the proposed embodiment of this document, and neural network models trained for images of luma component and chroma component may be selected and used, respectively. Alternatively, the above-described quantization parameters and information on whether it is a chroma component or a luma component may be applied together to train a neural network model, or may be simultaneously considered in selecting a neural network model.

Additionally, for example, a neural network model may be selected and used depending on the scale factor. For example, if the scale factor for the current coding unit is scale factor a, the A neural network model may be used, if the scale factor for the current coding unit is scale factor b, the B neural network model can be used to reconstruct the image. That is, for example, if the scale factor for the current coding unit is scale factor a, a first neural network model may be derived as the neural network model used to upscale the reconstructed block for the current coding block, when the scale factor for the current coding unit is scale factor b, a second neural network model may be used as the neural network model used to upscale the reconstructed block for the current coding block. There may be more than one neural network model used in the proposed embodiment of this document, and different neural network models may be selected and applied depending on the combination of scale factors for each width and height. Alternatively, the above-described quantization parameters, whether it is a chroma component or a luma component, and scale factor information may be applied together to train a neural network model, or may be simultaneously considered in selecting a neural network model.

Additionally, for example, a neural network model may be selected and used according to chroma component subsampling information. For example, a neural network model may be selected and used according to chroma component subsampling information, such as an RGB/BGR image, YUV4:2:0 image, YUV4:2:2 image, and YCoCg image. That is, for example, a neural network model can be derived based on chroma component subsampling information for the current coding block, here, the chroma subsampling information may be an RGB/BGR image, YUV4:2:0 image, YUV4:2:2 image, or YCoCg image. Alternatively, the above-described quantization parameters, whether it is a chroma component or a luma component, and scale factor information may be applied together to train a neural network model, or may be simultaneously considered in selecting a neural network model.

FIG. 10 schematically shows an image encoding method using an encoding device according to this document. The method disclosed in FIG. 10 may be performed by the encoding device disclosed in FIG. 2. Specifically, for example, S1000 to S1030 of FIG. 10 may be performed by the prediction unit of the encoding device, and S1040 to S1050 of FIG. 10 may be performed by the entropy encoding unit of the encoding device. In addition, although not shown, the process of deriving a residual sample for the current block may be performed by the residual processing unit of the encoding device, the process of generating a reconstructed sample and a reconstructed picture for the current block based on the residual sample and prediction sample for the current block may be performed by an addition unit of the encoding device.

The encoding device scales the current block to derive a modified current block (S1000). The encoding device may scale the current block to derive a modified current block.

For example, the encoding device may down-scale the current block to derive a modified current block. For example, the scale factor for the width of the current block may be a, and the scale factor for the height of the current block may be b. In this case, the encoding device may downscale the current block of size M×N to derive a modified current block of size aM×bN.

For example, the encoding device may downscale the current block based on a Finite Impulse Response (FIR) filter, an Infinite Impulse Response (IIR) filter, or a neural network model to derive a modified current block. Additionally, for example, the encoding device may downscale the current block based on an upscale filter, an interpolation filter, or a neural network model to derive a modified current block.

Additionally, for example, the encoding device may determine whether to scale the current block based on the RD cost. The encoding device may generate a flag for scale based on the result of the decision. The flag for scale may be signaled on a coding unit (CU), frame, or slice basis. The flag may indicate that scale is applied. Alternatively, the flag may indicate whether adaptive multi-resolution intra prediction is applied. Image information may include the above flag.

Additionally, for example, the encoding device may derive a neural network model for the current block, and may downscale the current block based on the neural network model to derive the modified current block. For example, the neural network model may be derived based on the quantization parameter of the current block, whether the current block is a luma block or a chroma block, the scale factor and/or chroma component subsampling information of the current block.

Additionally, for example, the scale factor for the current block may be preset. Or, for example, the scale factor may be derived based on information about the scale factor of the current block. For example, the encoding device may generate information about the scale factor of the current block. Information about the scale factor of the current block may be signaled in high-level syntax. Here, the high-level syntax may be Video Parameter Set (VPS), Sequence Parameter Set (SPS), Picture Parameter Set (PPS), Decoding Parameter Set (DPS), Picture Header (PH), Adaptation Parameter Set (APS) and/or Slice Header (SH). Or, for example, information about the scale factor of the current block may be derived based on information about the scale factor stored in the neighboring block. Or, for example, information about the scale factor of the current block may be derived based on information about the scale factor stored in the surrounding slice. Or, for example, information about the scale factor of the current block may be derived based on information about the scale factor stored in the reference picture. Or, for example, information about the scale factor of the current block may be derived based on information about a specific scale factor.

The encoding device derives the intra prediction mode of the modified current block (S1010). The encoding device can determine the intra prediction mode/type applied to the current block among the various intra prediction modes/types described above.

The encoding device can perform prediction based on various intra prediction modes and determine the optimal intra prediction mode based on rate-distortion optimization (RDO). For example, the encoding device may configure a Most Probable Mode (MPM) list of the current block based on the neighboring block of the current block. The neighboring block may include a left neighboring block and/or an upper neighboring block of the current block. The encoding device may configure the MPM list based on the intra prediction mode of the left neighboring block and the intra prediction mode of the upper neighboring block.

The encoding device may determine the optimal intra prediction mode using only the MPM candidates configured in the MPM list and the planner intra prediction mode, alternatively, the optimal intra prediction mode may be determined by further using the remaining intra prediction modes as well as the MPM candidates and planner intra prediction modes configured in the MPM list.

The encoding device scales the surrounding samples for the modified current block and derives modified surrounding reference samples for the modified current block (S1020). The encoding device may scale neighboring samples for the current block to derive modified neighboring reference samples for the current block. For example, the encoding device may derive surrounding reference samples for intra prediction of the current block.

For example, the current block may be a scaled block. The encoding device may scale neighboring samples of the current block based on the scale factor of the current block, and derive the scaled neighboring samples as neighboring reference samples of the current block. For example, the scale factor for the width of the current block may be a, and the scale factor for the height of the current block may be b. For example, the left peripheral samples of the current block may be subsampled in units of 1/a to derive modified left peripheral reference samples for the current block. Additionally, for example, the upper peripheral samples of the current block may be subsampled in units of 1/b to derive modified upper peripheral reference samples for the current block. Here, the scale factor a for the width of the current block and the scale factor b for the height of the current block may be the same or different.

Or, for example, the neighboring block of the current block may be a scaled block. The encoding device may scale neighboring samples of the current block based on the scale factor of the neighboring block of the current block, the scaled neighboring samples can be derived as neighboring reference samples of the current block.

For example, neighboring samples of the current block may be included in a CTU that is different from the current CTU that includes the current block. The encoding device may scale the neighboring samples of the current block based on whether the neighboring samples for the current block are included in a CTU different from the current block and the current CTU including the current block, the scaled neighboring samples can be derived as neighboring reference samples of the current block. For example, if the neighboring samples for the current block are included in a CTU different from the current CTU including the current block, the encoding device may scale the neighboring samples of the current block, the scaled neighboring samples can be derived as neighboring reference samples of the current block. For example, the scale may be performed based on a 3-tap filter of [1, 2, 1]/4 or a 5-tap filter of [−1, 9, 16, 9, −1]/32. Alternatively, for example, a filter for the scale may be derived based on the scale factor for a neighboring block including the neighboring samples and the sub-pel position of the neighboring sample to be scaled. Or, for example, the scaling may be performed based on an RPR down-sampling filter. Or, for example, a filter for the scale may be derived based on the scale factor for a neighboring block including the neighboring samples. Or, for example, a filter for the scale may be derived regardless of the scale factor for the neighboring block including the neighboring samples.

The encoding device derives prediction samples for the modified current block based on the intra prediction mode and the modified surrounding reference samples (S1030). The encoding device may derive the prediction samples based on the intra prediction mode and the modified peripheral reference samples. The encoding device may derive a reference sample according to the intra prediction mode of the current block among the modified surrounding reference samples, and may derive a prediction sample of the current block based on the reference sample.

The encoding device encodes image information including intra prediction-related information for the modified current block (S1040). The encoding device may generate and encode image information including the intra prediction-related information for the current block. The image information may be output in bitstream form. For example, the intra prediction related information may include the intra prediction mode information and/or intra prediction type information.

For example, the intra prediction type information may be implemented in various forms. As an example, the intra prediction type information may include MIP flag indicating whether matrix-based intra prediction (MIP) is applied to the current block, a reference sample line index indicating which reference sample line is used when MRL is applied to the current block, and/or ISP flag indicating whether ISP applies to the current block. The syntax element of the MIP flag may be intra_mip_flag, the syntax element of the reference sample line index may be intra_luma_ref_idx, and the syntax element of the ISP flag may be intra_subpartitions_mode_flag.

Additionally, for example, the intra prediction mode information may include an MPM flag indicating whether a most probable mode (MPM) or a remaining intra prediction mode is applied to the current block. Additionally, for example, when the MPM is applied to the current block, the intra prediction mode information may include a not planner flag indicating whether the intra prediction mode of the current block is not a planar intra prediction mode. The not planner flag with a value of 0 may indicate that the intra prediction mode of the current block is a planner intra prediction mode, the Not Planner flag with a value of 1 may indicate that the intra prediction mode of the current block is not a planner intra prediction mode.

Additionally, for example, if the MPM is applied to the current block and the intra prediction mode is not a planner intra prediction mode, the intra prediction mode information may include an MPM index indicating one of the MPM candidates in the MPM list for the current block. The MPM list may also be referred to as an MPM candidate list. Additionally, for example, if the MPM is not applied to the current block, the intra prediction mode information may include remaining mode information indicating one of the remaining intra prediction modes excluding the intra prediction mode candidates (MPM candidates). The syntax element of the MPM flag may be intra_luma_mpm_flag, the syntax element of the not planar flag may be intra_luma_not_planar_flag, the syntax element of the MPM index may be intra_luma_mpm_idx, and the syntax element of the remaining mode information may be intra_luma_mpm_remainder.

Meanwhile, for example, the current block may be a scaled block. As an example, image information about the current block including the intra prediction-related information may be adjusted based on the scale factor of the current block. For example, the location information of the left neighboring block and/or the upper neighboring block of the current block may be location information adjusted based on the scale factor. For example, the location information of the left neighboring block of the current block may be adjusted based on the scale factor, and the block corresponding to the adjusted location information may be derived as the left neighboring block of the current block. For example, if the position of the current block is (0, x) and the scale factor is a, (−1, x), which is the location information of the left neighboring block, can be adjusted to (−1, x/a), a block corresponding to the adjusted location information (−1, x/a) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Also, for example, the neighboring block of the current block may be a scaled block. For example, image information about the current block including the intra prediction-related information may be adjusted based on the scale factor of the neighboring block of the current block. For example, the location information of the left neighboring block and/or the upper neighboring block of the current block may be location information adjusted based on the scale factor. For example, the location information of the left neighboring block of the current block may be adjusted based on the scale factor, and the block corresponding to the adjusted location information may be derived as the left neighboring block of the current block. For example, if the position of the current block is (0, x) and the scale factor of the left neighboring block is a_left, (−1, x), which is the location information of the left neighboring block, can be adjusted to (−1, x*a_left), a block corresponding to the adjusted location information (−1, x*a_left) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Also, for example, the current block and the neighboring block of the current block may be scaled blocks. As an example, image information about the current block including the intra prediction-related information may be information adjusted based on the scale factor of the current block and the scale factor of the neighboring block. For example, the location information of the left neighboring block and/or the upper neighboring block of the current block may be location information adjusted based on the scale factor of the current block and the scale factors of the left neighboring block and/or the upper neighboring block. For example, the location information of the left neighboring block of the current block may be adjusted based on the scale factor of the current block and the scale factor of the left neighboring block, a block corresponding to the adjusted location information may be derived as a left neighboring block of the current block. For example, if the position of the current block is (0, x), the scale factor of the current block is a, and the scale factor of the left neighboring block is a_left, (−1, x), which is the location information of the left neighboring block, can be adjusted to (−1, x*a_left/a), a block corresponding to the adjusted location information (−1, x*a_left/a) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Or, for example, the intra prediction-related information of the current block may be information adjusted based on whether the current block is scaled. For example, the intra prediction-related information may be information adjusted based on the scale factor of the current block. For example, when the current block is downscaled (i.e., when the size of the current block is reduced based on the scale), the intra prediction-related information may be information copied as much as the scale factor of the current block. Additionally, for example, when the current block is downscaled, image information about the current block may be information copied by the scale factor of the current block. The image information may include prediction mode information, transformation information, quantization information, residual information, motion vector information, and/or reference picture information. Additionally, for example, when the current block is upscaled (i.e., when the size of the current block is increased based on the scale), the intra prediction-related information may be information downsampled by the scale factor of the current block. Additionally, for example, when the current block is upscaled, image information about the current block may be downsampled information by the scale factor of the current block. The image information may include prediction mode information, transformation information, quantization information, residual information, motion vector information, and/or reference picture information.

Or, for example, the intra prediction-related information may be information adjusted based on whether the current block is a luma component or a chroma component. For example, if the luma block is scaled and the chroma block is not scaled, the intra prediction-related information may be information adjusted based on whether the current block is a luma block and chroma component subsampling information for the current block. For example, if the luma block is scaled and the chroma block is not scaled, if the current block is a chroma block, the intra prediction-related information may be information adjusted based on chroma component subsampling information for the current block and the scale factor of the luma block for the chroma block. In this case, the luma block of the position information adjusted based on the chroma component subsampling information and the scale factor may be derived as the corresponding luma block for intra prediction of the current block. The chroma component subsampling information may be RGB/BGR, YUV4:2:0, YUV4:2:2, or YUV4:4:4.

Additionally, for example, the encoding device may generate a flag for whether to scale, the flag for scale may be signaled on a coding unit (CU), frame, or slice basis. The flag may indicate that scale is applied. Alternatively, the flag may indicate whether the adaptive multi-resolution intra prediction is applied. The image information may include the flag.

Additionally, for example, the image information may include information about the scale factor of the current block. For example, information about the scale factor of the current block may be signaled in high-level syntax. Here, the high-level syntax may be Video Parameter Set (VPS), Sequence Parameter Set (SPS), Picture Parameter Set (PPS), Decoding Parameter Set (DPS), Picture Header (PH), Adaptation Parameter Set (APS) and/or Slice Header (SH).

Additionally, for example, the image information may include residual information of the current block. For example, the encoding device may derive residual samples of the current block based on the prediction samples of the current block. For example, the encoding device may derive a residual sample by subtracting the original sample and the predicted sample for the current block. For example, the encoding device may derive residual coefficients of the current block based on residual samples of the current block. For example, the encoding device may encode residual information about the residual coefficients. For example, the residual information may include residual information about the residual coefficients of the residual samples.

As an example, the residual information may be information adjusted based on whether the current block is scaled. For example, the residual information may be information adjusted based on the scale factor of the current block. For example, when the current block is downscaled (i.e., when the size of the current block is reduced based on the scale), the residual information may be information copied as much as the scale factor of the current block. Additionally, for example, when the current block is upscaled (i.e., when the size of the current block is increased based on the scale), the residual information may be information downsampled by the scale factor of the current block.

The encoding device generates a bitstream including the video information (S1050). An encoding device can generate a bitstream including the video information. The encoding device can generate and output a bitstream including the video information.

Meanwhile, a bitstream containing the video information may be transmitted to a decoding device through a network or (digital) storage medium. Here, the network may include a broadcasting network and/or a communication network, and the digital storage medium may include various storage media such as USB, SD, CD, DVD, Blu-ray, HDD, and SSD.

Figure 11:
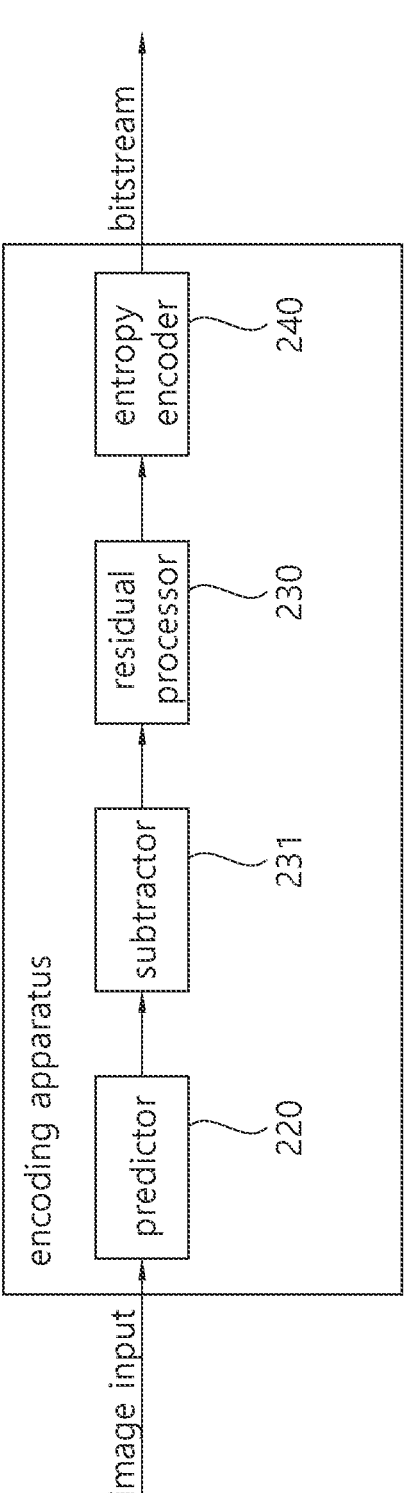
FIG. 11 schematically shows an encoding device that performs the image encoding method according to this document.

FIG. 11 schematically shows an encoding device that performs the image encoding method according to this document. The method disclosed in FIG. 11 may be performed by the encoding device disclosed in FIG. 10. Specifically, for example, the prediction unit of the encoding device of FIG. 11 may perform steps S1000 to S1030 of FIG. 10, and the entropy encoding unit of the encoding device may perform steps S1040 to S1050. In addition, although not shown, the process of deriving a residual sample may be performed by the residual processing unit of the encoding device, the process of generating a reconstructed sample and a reconstructed picture based on the residual sample and the prediction sample may be performed by an addition unit of the encoding device.

FIG. 12 schematically shows a video decoding method using a decoding device according to this document. The method disclosed in FIG. 12 can be performed by the decoding device disclosed in FIG. 3. Specifically, for example, S1000 to S1030 of FIG. 12 may be performed by the entropy decoding unit of the decoding device, S1040 of FIG. 12 may be performed by the residual processing unit of the decoding device, S1050 of FIG. 12 may be performed by the addition unit of the decoding device. In addition, although not shown, the process of receiving residual information for the current block may be performed by the entropy decoding unit of the decoding device, the process of deriving residual samples of the current block may be performed by an inverse transform unit and an inverse quantization unit of the decoding device.

The decoding device derives the intra prediction mode of the current block (S1200). The decoding device can derive the intra prediction mode of the current block.

For example, a decoding device may obtain image information including intra prediction-related information through a bitstream. The decoding device may derive the intra prediction mode of the current block based on the intra prediction related information. The intra prediction related information may include the intra prediction mode information and/or intra prediction type information.

For example, the intra prediction type information may be implemented in various forms. As an example, the intra prediction type information may include MIP flag indicating whether matrix-based intra prediction (MIP) is applied to the current block, a reference sample line index indicating which reference sample line is used when MRL is applied to the current block, and/or ISP flag indicating whether ISP applies to the current block. The syntax element of the MIP flag may be intra_mip_flag, the syntax element of the reference sample line index may be intra_luma_ref_idx, and the syntax element of the ISP flag may be intra_subpartitions_mode_flag.

Additionally, for example, the intra prediction mode information may include an MPM flag indicating whether a most probable mode (MPM) or a remaining intra prediction mode is applied to the current block. Also, for example, when the MPM is applied to the current block, that is, when the MPM flag indicates that the MPM is applied to the current block, the intra prediction mode information may include a not planner flag indicating whether the intra prediction mode of the current block is not a planar intra prediction mode. The not planner flag with a value of 0 may indicate that the intra prediction mode of the current block is a planner intra prediction mode, the Not Planner flag with a value of 1 may indicate that the intra prediction mode of the current block is not a planner intra prediction mode.

Additionally, for example, if the MPM is applied to the current block and the intra prediction mode is not a planner intra prediction mode, that is, when the MPM flag indicates that the MPM is applied to the current block and the Not Planner flag indicates that the intra prediction mode of the current block is not a planner intra prediction mode, the intra prediction mode information may include an MPM index indicating one of the MPM candidates in the MPM list for the current block. The MPM list may be constructed based on intra prediction modes of neighboring blocks of the current block, the neighboring blocks may include a left neighboring block and/or an upper neighboring block of the current block. The MPM list may also be referred to as an MPM candidate list. The decoding device may derive the MPM candidate indicated by the MPM index among the MPM candidates in the MPM list in the intra prediction mode of the current block. Also, for example, when the MPM is not applied to the current block, that is, when the MPM flag indicates that the MPM is not applied to the current block, the intra prediction mode information may include remaining mode information indicating one of the remaining intra prediction modes excluding the intra prediction mode candidates (MPM candidates). The decoding device may derive the intra prediction mode indicated by the remaining mode information as the intra prediction mode of the current block. The syntax element of the MPM flag may be intra_luma_mpm_flag, the syntax element of the not planar flag may be intra_luma_not_planar_flag, the syntax element of the MPM index may be intra_luma_mpm_idx, and the syntax element of the remaining mode information may be intra_luma_mpm_remainder.

Meanwhile, for example, the current block may be a scaled block. As an example, image information about the current block including the intra prediction-related information may be adjusted based on the scale factor of the current block. For example, the location information of the left neighboring block and/or the upper neighboring block of the current block may be location information adjusted based on the scale factor. For example, the location information of the left neighboring block of the current block may be adjusted based on the scale factor, a block corresponding to the adjusted location information may be derived as a left neighboring block of the current block. For example, if the position of the current block is (0, x) and the scale factor is a, (−1, x), which is the location information of the left neighboring block, can be adjusted to (−1, x/a), a block corresponding to the adjusted location information (−1, x/a) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Also, for example, the neighboring block of the current block may be a scaled block. For example, image information about the current block including the intra prediction-related information may be adjusted based on the scale factor of the neighboring block of the current block. For example, the location information of the left neighboring block and/or the upper neighboring block of the current block may be location information adjusted based on the scale factor. For example, the location information of the left neighboring block of the current block may be adjusted based on the scale factor, and the block corresponding to the adjusted location information may be derived as the left neighboring block of the current block. For example, if the position of the current block is (0, x) and the scale factor of the left neighboring block is a_left, (−1, x), which is the location information of the left neighboring block, can be adjusted to (−1, x*a_left), a block corresponding to the adjusted location information (−1, x*a_left) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Also, for example, the current block and the neighboring block of the current block may be scaled blocks. As an example, image information about the current block including the intra prediction-related information may be information adjusted based on the scale factor of the current block and the scale factor of the neighboring block. For example, the location information of the left neighboring block and/or the upper neighboring block of the current block may be location information adjusted based on the scale factor of the current block and the scale factors of the left neighboring block and/or the upper neighboring block. For example, the location information of the left neighboring block of the current block may be adjusted based on the scale factor of the current block and the scale factor of the left neighboring block, a block corresponding to the adjusted location information may be derived as a left neighboring block of the current block. For example, if the position of the current block is (0, x), the scale factor of the current block is a, and the scale factor of the left neighboring block is a_left, (−1, x), which is the location information of the left neighboring block, can be adjusted to (−1, x*a_left/a), a block corresponding to the adjusted location information (−1, x*a_left/a) may be derived as a left neighboring block of the current block. Thereafter, the derived prediction-related information of the left neighboring block can be used for intra prediction of the current block. For example, the MPM list of the current block may be constructed based on the derived intra prediction mode of the left neighboring block.

Or, for example, the intra prediction-related information of the current block may be information adjusted based on whether the current block is scaled. For example, the intra prediction-related information may be information adjusted based on the scale factor of the current block. For example, when the current block is downscaled (i.e., when the size of the current block is reduced based on the scale), the intra prediction-related information may be information copied as much as the scale factor of the current block. Additionally, for example, when the current block is downscaled, image information about the current block may be information copied by the scale factor of the current block. The image information may include prediction mode information, transformation information, quantization information, residual information, motion vector information, and/or reference picture information. Additionally, for example, when the current block is upscaled (i.e., when the size of the current block is increased based on the scale), the intra prediction-related information may be information downsampled by the scale factor of the current block. Additionally, for example, when the current block is upscaled, image information about the current block may be downsampled information by the scale factor of the current block. The image information may include prediction mode information, transformation information, quantization information, residual information, motion vector information, and/or reference picture information.

Or, for example, the intra prediction-related information may be information adjusted based on whether the current block is a luma component or a chroma component. For example, if the luma block is scaled and the chroma block is not scaled, the intra prediction-related information may be information adjusted based on whether the current block is a luma block and chroma component subsampling information for the current block. For example, if the luma block is scaled and the chroma block is not scaled, if the current block is a chroma block, the intra prediction-related information may be information adjusted based on chroma component subsampling information for the current block and the scale factor of the luma block for the chroma block. In this case, the luma block of the position information adjusted based on the chroma component subsampling information and the scale factor may be derived as the corresponding luma block for intra prediction of the current block. The chroma component subsampling information may be RGB/BGR, YUV4:2:0, YUV4:2:2, or YUV4:4:4.

The decoding device scales the surrounding samples for the current block and derives modified surrounding reference samples for the current block (S1210). The decoding device may scale neighboring samples for the current block to derive modified neighboring reference samples for the current block. For example, the decoding device may derive surrounding reference samples for intra prediction of the current block.

For example, the current block may be a scaled block. The decoding device may scale neighboring samples of the current block based on the scale factor of the current block, and derive the scaled neighboring samples as neighboring reference samples of the current block. For example, the scale factor for the width of the current block may be a, and the scale factor for the height of the current block may be b. For example, the left peripheral samples of the current block may be subsampled in units of 1/a to derive modified left peripheral reference samples for the current block. Additionally, for example, the upper peripheral samples of the current block may be subsampled in units of 1/b to derive modified upper peripheral reference samples for the current block. Here, the scale factor a for the width of the current block and the scale factor b for the height of the current block may be the same or different.

Or, for example, the neighboring block of the current block may be a scaled block. The decoding device may scale neighboring samples of the current block based on the scale factor of the neighboring block of the current block, and derive the scaled neighboring samples as neighboring reference samples of the current block.

For example, neighboring samples of the current block may be included in a CTU that is different from the current CTU that includes the current block. The decoding device may scale the neighboring samples of the current block based on whether the neighboring samples for the current block are included in a CTU different from the current block and the current CTU including the current block, the scaled neighboring samples can be derived as neighboring reference samples of the current block. For example, if the neighboring samples for the current block are included in a CTU different from the current CTU including the current block, the decoding device may scale the neighboring samples of the current block, the scaled neighboring samples can be derived as neighboring reference samples of the current block. For example, the scale may be performed based on a 3-tap filter of [1, 2, 1]/4 or a 5-tap filter of [−1, 9, 16, 9, −1]/32. Alternatively, for example, a filter for the scale may be derived based on the scale factor for a neighboring block including the neighboring samples and the sub-pel position of the neighboring sample to be scaled. Or, for example, the scaling may be performed based on an RPR down-sampling filter. Or, for example, a filter for the scale may be derived based on the scale factor for a neighboring block including the neighboring samples. Or, for example, a filter for the scale may be derived regardless of the scale factor for the neighboring block including the neighboring samples.

The decoding device derives prediction samples for the current block based on the intra prediction mode and the modified surrounding reference samples (S1220). The decoding device may derive the prediction samples based on the intra prediction mode and the modified peripheral reference samples The decoding device may derive a reference sample according to the intra prediction mode of the current block among the modified neighboring reference samples, and may derive a prediction sample of the current block based on the reference sample.

The decoding device derives a reconstructed block for the current block based on the prediction samples (S1230). The decoding device may derive a reconstructed block or reconstructed picture for the current block based on the prediction samples. For example, the decoding device may derive the reconstructed block including reconstructed samples for the current block through addition of the prediction samples of the current block and the residual samples of the current block.

Meanwhile, for example, the decoding device may derive residual samples of the current block based on the received residual information. The decoding device may generate a reconstructed block and/or a reconstructed picture through addition of the prediction samples and the residual samples. Meanwhile, as an example, the residual information may be information adjusted based on whether the current block is scaled. For example, the residual information may be information adjusted based on the scale factor of the current block. For example, when the current block is downscaled (i.e., when the size of the current block is reduced based on the scale), the residual information may be information copied as much as the scale factor of the current block. Additionally, for example, when the current block is upscaled (i.e., when the size of the current block is increased based on the scale), the residual information may be information downsampled by the scale factor of the current block.

The decoding device upscales the reconstructed block to derive a modified reconstructed block (S1240). The decoding device may upscale the reconstructed block to derive a modified reconstructed block. For example, the scale factor for the width of the current block may be a, and the scale factor for the height of the current block may be b. In this case, the decoding device may upscale the reconstructed block of size aM×bN to derive a modified reconstructed block of size M×N.

For example, the decoding device may derive a modified reconstructed block by upscaling the reconstructed block based on a Finite Impulse Response (FIR) filter, an Infinite Impulse Response (IIR) filter, or a neural network model. Additionally, for example, the decoding device may derive a modified reconstructed block by upscaling the reconstructed block based on an upscale filter, an interpolation filter, or a neural network model.

Additionally, for example, the decoding device may obtain a flag for whether scale is applied, and if the flag indicates that scale is applied, the decoding device may upscale the reconstructed block to derive a modified reconstructed block. The flag for scale may be signaled on a coding unit (CU), frame, or slice basis. The flag may indicate that scale is applied. Alternatively, the flag may indicate whether the adaptive multi-resolution intra prediction is applied. The image information may include the flag.

Additionally, for example, the decoding device may derive a neural network model for the current block, and may upscale the reconstructed block based on the neural network model to derive the modified reconstructed block. For example, the neural network model may be derived based on the quantization parameter of the current block, whether the current block is a luma block or a chroma block, the scale factor and/or chroma component subsampling information of the current block.

Additionally, for example, the scale factor for the current block may be preset. Or, for example, the scale factor may be derived based on information about the scale factor of the current block. For example, information about the scale factor of the current block may be signaled in high-level syntax. Here, the high-level syntax may be Video Parameter Set (VPS), Sequence Parameter Set (SPS), Picture Parameter Set (PPS), Decoding Parameter Set (DPS), Picture Header (PH), Adaptation Parameter Set (APS) and/or Slice Header (SH). Or, for example, information about the scale factor of the current block may be derived based on information about the scale factor stored in the neighboring block. Or, for example, information about the scale factor of the current block may be derived based on information about the scale factor stored in the surrounding slice. Or, for example, information about the scale factor of the current block may be derived based on information about the scale factor stored in the reference picture. Or, for example, information about the scale factor of the current block may be derived based on information about a specific scale factor.

As described above, in-loop filtering procedures such as deblocking filtering, SAO and/or ALF procedures may be applied to the reconstructed block or the modified reconstructed block to improve subjective/objective image quality as needed.

FIG. 13 schematically shows a decoding device that performs the image decoding method according to this document. The method disclosed in FIG. 12 can be performed by the decoding device disclosed in FIG. 13. Specifically, for example, the prediction unit of the decoding device of FIG. 13 may perform steps S1200 to S1220 of FIG. 12, and the addition unit of the decoding device of FIG. 13 may perform steps S1230 to S1240 of FIG. 12.

According to this document described above, an intra prediction coding method can be performed based on a scaled coding block, through which the amount of information about the coding block can be reduced and overall coding efficiency can be improved.

In addition, according to this document, information related to reference samples and intra prediction can be adjusted by considering the resolution difference between the scaled coding block and the neighboring block, through this, adaptive multi-resolution intra prediction can be performed efficiently, the amount of information about the coding block can be reduced, and overall coding efficiency can be improved.

In addition, according to this document, a neural network model for adaptive multi-resolution intra prediction can be adaptively derived based on coding blocks, and through this, the coding performance and efficiency of adaptive multi-resolution intra prediction can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 14:
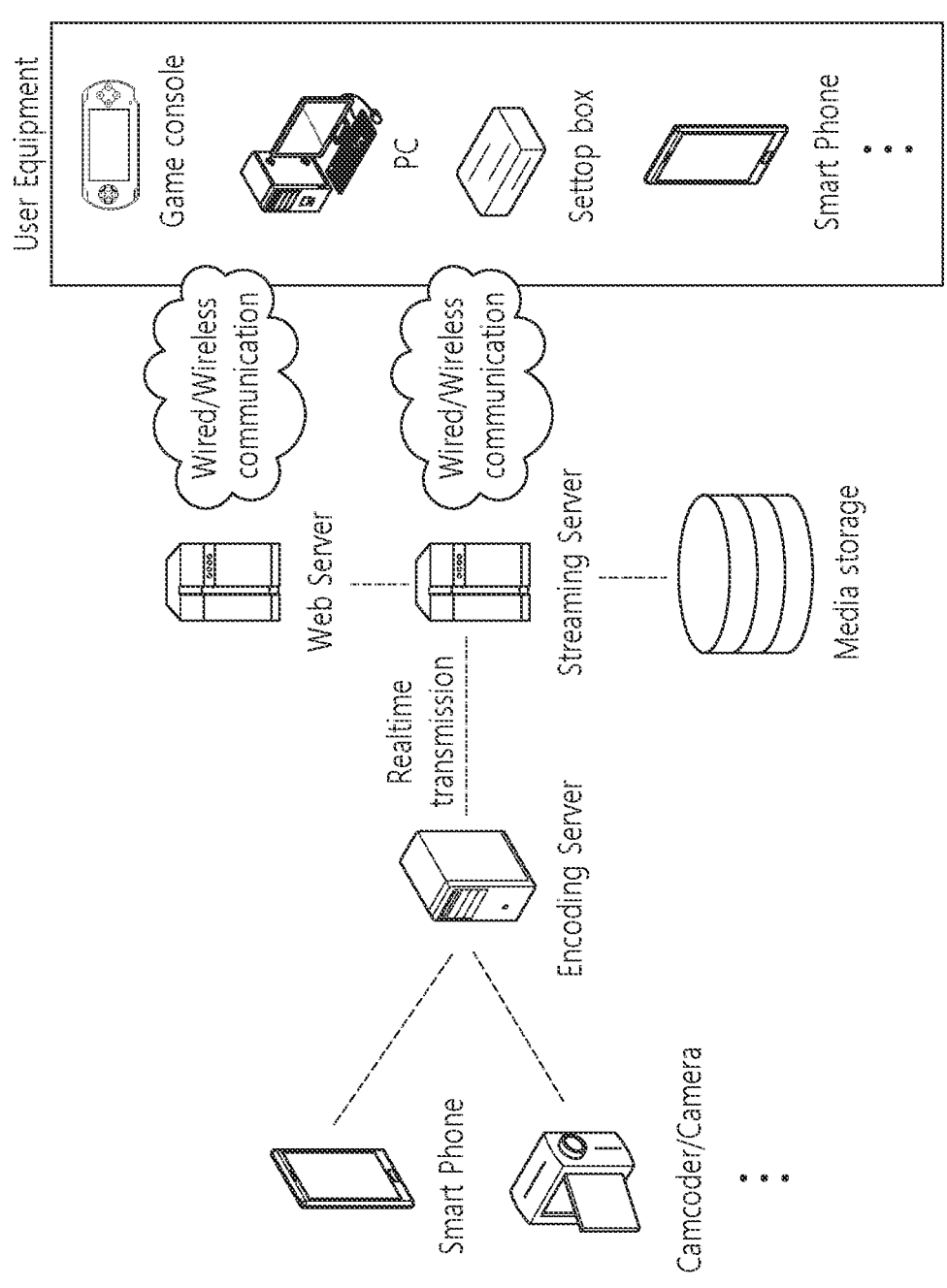
FIG. 14 illustrates a structural diagram of a contents streaming system to which the present disclosure is applied.

FIG. 14 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for an image decoding, the method performed by a decoding apparatus and comprising:
deriving an intra prediction mode of a current block;
deriving modified neighboring reference samples for the current block by scaling neighboring samples for the current block;
deriving prediction samples for the current block based on the intra prediction mode and the modified neighboring reference samples;
deriving a reconstructed block for the current block based on the prediction samples; and
deriving a modified reconstructed block by upscaling the reconstructed block,
wherein the deriving the modified neighboring reference samples for the current block comprises:
scaling the neighboring samples of the current block based on a scale factor of the current block; and
deriving the scaled neighboring samples as neighboring reference samples of the current block,
wherein the scale factor for a width of the current block is a, and the scale factor for a height of the current block is b,
wherein left neighboring samples of the current block are derived as modified left neighboring reference samples for the current block by subsampling by 1/a, and
wherein upper neighboring samples of the current block are derived as modified upper neighboring reference samples for the current block by subsampling by 1/b.

2. The method of claim 1, wherein the deriving the modified neighboring reference samples for the current block comprises:
determining whether the neighboring samples are included in a coding tree unit (CTU) which is different from a current CTU including the current block;
if the neighboring samples are included in the CTU different from the current CTU, scaling the neighboring samples; and
deriving the scaled neighboring samples as neighboring reference samples.

3. The method of claim 2, wherein the neighboring samples are scaled based on a 3-tap filter of [1, 2, 1]/4 or a 5-tap filter of [−1, 9, 16, 9, −1]/32.

4. The method of claim 2, wherein a filter for the scale is derived based on a scale factor for a neighboring block including the neighboring samples.

5. The method of claim 1, further comprising obtaining image information including intra prediction related information in the current block,
wherein the current block is a scaled block, and the image information for the current block is adjusted based on the scale factor of the current block.

6. The method of claim 5, wherein, if a position of the current block is (0, x) and the scale factor is a, (−1, x) which is position information of a left neighboring block of the current block is adjusted to (−1, x/a), and
wherein a block corresponding to the adjusted position information (−1, x/a) is derived as the left neighboring block.

7. The method of claim 1, further comprising obtaining image information including intra prediction related information in the current block,
wherein a neighboring block of the current block is a scaled block, and the image information for the current block is adjusted based on a scale factor of the neighboring block.

8. The method of claim 7, wherein, if a position of the current block is (0, x) and the scale factor of a left neighboring block of the current block is a left, (−1, x) which is position information of the left neighboring block is adjusted to (−1, x*a_left), and
wherein a block corresponding to (−1, x*a_left) which is the adjusted location information is derived as the left neighboring block.

9. The method of claim 1, wherein the deriving the modified reconstructed block comprises:
deriving the modified reconstructed block by upscaling the reconstructed block based on a neural network model.

10. The method of claim 9, wherein the neural network model is derived based on quantization parameters of the current block.

11. The method of claim 9, wherein the neural network model is derived based on whether the current block is a luma block or a chroma block.

12. A method for an image encoding, the method performed by an encoding apparatus and comprising:
deriving a modified current block by scaling a current block;
deriving an intra prediction mode of the modified current block;
deriving modified neighboring reference samples for the modified current block by scaling neighboring samples for the modified current block;
deriving prediction samples for the modified current block based on the intra prediction mode and the modified neighboring reference samples;
encoding image information including intra prediction related information for the modified current block; and
generating a bitstream including the image information,
wherein the deriving the modified neighboring reference samples for the current block comprises:
scaling the neighboring samples of the current block based on a scale factor of the current block; and
deriving the scaled neighboring samples as neighboring reference samples of the current block,
wherein the scale factor for a width of the current block is a, and the scale factor for a height of the current block is b,
wherein left neighboring samples of the current block are derived as modified left neighboring reference samples for the current block by subsampling by 1/a, and wherein upper neighboring samples of the current block are derived as modified upper neighboring reference samples for the current block by subsampling by 1/b.

13. A computer-readable digital storage medium which stores a bitstream generated by a specific method, wherein the specific method comprises:

deriving a modified current block by scaling a current block;

deriving an intra prediction mode of the modified current block;

deriving modified neighboring reference samples for the modified current block by scaling neighboring samples for the modified current block;

deriving prediction samples for the modified current block based on the intra prediction mode and the modified neighboring reference samples;

encoding image information including intra prediction related information for the modified current block; and generating the bitstream including the image information, wherein the deriving the modified neighboring reference samples for the current block comprises:

scaling the neighboring samples of the current block based on a scale factor of the current block; and deriving the scaled neighboring samples as neighboring reference samples of the current block, wherein the scale factor for a width of the current block is a, and the scale factor for a height of the current block is b, wherein left neighboring samples of the current block are derived as modified left neighboring reference samples for the current block by subsampling by 1/a, and wherein upper neighboring samples of the current block are derived as modified upper neighboring reference samples for the current block by subsampling by 1/b.

\* \* \* \* \*